(12) United States Patent
Iwata et al.

(10) Patent No.: US 11,331,892 B2
(45) Date of Patent: May 17, 2022

(54) LAMINATING APPARATUS

(71) Applicant: Nikko-Materials Co., Ltd., Yokohama (JP)

(72) Inventors: Kazutoshi Iwata, Kanagawa (JP); Yoshiaki Honma, Kanagawa (JP); Takeshi Yamaguchi, Kanagawa (JP); Taihei Matsumoto, Kanagawa (JP)

(73) Assignee: NIKKO-MATERIALS CO., LTD., Kanagawa (JP)

( * ) Notice: Subject to any disclaimer, the term of this patent is extended or adjusted under 35 U.S.C. 154(b) by 0 days.

(21) Appl. No.: 17/330,637

(22) Filed: May 26, 2021

(65) Prior Publication Data

US 2021/0370656 A1 Dec. 2, 2021

(30) Foreign Application Priority Data

May 28, 2020 (JP) .............................. JP2020-093041

(51) Int. Cl.
*B32B 37/00* (2006.01)
*B32B 37/10* (2006.01)
*B29C 65/00* (2006.01)

(52) U.S. Cl.
CPC .... *B32B 37/0046* (2013.01); *B29C 66/81419* (2013.01); *B32B 37/10* (2013.01); *B29C 66/83221* (2013.01)

(58) Field of Classification Search
CPC . B32B 37/10; B32B 37/1054; B32B 37/0046; B29C 66/8141; B29C 66/81411; B29C 66/81415; B29C 66/81419; B29C 66/832; B29C 66/8322; B29C 66/83221; B29C 66/81264

USPC ........................................................ 156/228
See application file for complete search history.

(56) References Cited

U.S. PATENT DOCUMENTS

| 4,557,792 A | 12/1985 | Yamada et al. |
| 2018/0111331 A1* | 4/2018 | Bonte ..................... B29C 65/02 |
| 2018/0162111 A1* | 6/2018 | Iwata ................... B32B 37/1054 |

FOREIGN PATENT DOCUMENTS

| JP | 59-191600 | 10/1984 |
| JP | 62-62740 | 3/1987 |
| JP | 2003-217799 | 7/2003 |
| WO | 2016/199687 | 12/2016 |

* cited by examiner

*Primary Examiner* — Carson Gross
(74) *Attorney, Agent, or Firm* — Wenderoth, Lind & Ponack, L.L.P.

(57) ABSTRACT

A laminating apparatus for improving the uniformity of the thickness of a resulting laminate to improve the yield of products such as laminates is provided. A pressing device includes: a first press block movable back and forth; a second press block disposed in opposed relation to the first press block; a first pressing plate mounted to the inside of the first press block; and a second pressing plate mounted to the inside of the second press block. The first pressing plate and the second pressing plate are opposed to each other. A surface of the first pressing plate which is opposed to the second pressing plate has a peripheral portion formed into a tapered surface in such a manner that the distance from the second pressing plate increases in an outward direction.

11 Claims, 11 Drawing Sheets

RELATED ART

RELATED ART

RELATED ART

LAMINATING APPARATUS

TECHNICAL FIELD

The present disclosure relates to a laminating apparatus for laminating a substrate and a film together. More particularly, the present disclosure relates to a laminating apparatus capable of making the thickness of a resulting laminate more uniform when manufacturing the laminate obtained by laminating a substrate (e.g., a printed circuit board and a wafer) and a resin film together.

BACKGROUND ART

In an apparatus for laminating a substrate having an uneven surface resulting from interconnections and the like and a film made of resin together, a variety of contrivances have been hitherto made to make the thickness of resulting laminates uniform (as disclosed, for example, in International Publication No. WO 2016/199687) because variations in the thickness of the resulting laminates cause quality deficiencies and unnecessary space when the laminates are stacked in multiple layers, which results in a bulky stack.

One of these contrivances having been hitherto made is as follows. In pressing a film by a heated pressing plate in the step of laminating a substrate and the film together, the entire surface of the aforementioned pressing plate is typically pressed uniformly against the entire surface of the film for the purpose of pressing the entire surface of the film evenly.

For the purpose of laminating a substrate 52, resin layers 55, and films 51 (a stack of these in an unpressed state may be referred to as a "workpiece 53") together in the aforementioned step as shown in FIG. 15A, the entire surfaces of pressing plates 50 mounted to the inside of press blocks (not shown) are required to be pressed as uniformly as possible. If the entire surfaces of the pressing plates 50 are pressed with a strong force against surfaces of the workpiece 53 as uniformly as possible, the resin layers 55 between the films 51 are pushed out of the films 51 or the films 51 themselves are cut in some cases in an edge portion of a laminate 56 (with reference to FIG. 15B) obtained after the pressing. More specifically, as shown in FIG. 15B (an enlarged view of an area enclosed by a circle in FIG. 15A), the resin layers 55 between the films 51 are pushed out of edge portions of the films 51 to an unintended position. This sometimes gives rise to a problem such that the resin layers 55 are thinned or break off to seep out (resin seepage 55a) in an edge portion of the resulting laminate 56. The thinned or broken portion of the resin layers 55 can no longer be used as a product resulting in a decrease in the yield of products (laminates). Thus, there is a strong need for measures to counter this problem.

SUMMARY

In view of the foregoing, the present disclosure provides a laminating apparatus for improving the uniformity of the thickness of a resulting laminate to improve the yield of products (laminates).

The subject matter of the present disclosure has the following aspects [1] to [4].

[1] A laminating apparatus comprising a pressing device for pressing a substrate and a film, the pressing device including a first press block movable back and forth, a second press block disposed in opposed relation to the first press block, a first pressing plate mounted to the inside of the first press block, and a second pressing plate mounted to the inside of the second press block, the first pressing plate and the second pressing plate being opposed to each other, wherein a surface of the first pressing plate which is opposed to the second pressing plate has a peripheral portion formed into a tapered surface in such a manner that a distance from the first pressing plate to the second pressing plate increases in an outward direction.

[2] The laminating apparatus according to the aspect [1], wherein a surface of the second pressing plate which is opposed to the first pressing plate is formed into a tapered surface in such a manner that a distance from the second pressing plate to the first pressing plate increases in an outward direction.

[3] The laminating apparatus according to the aspect [1] or [2], wherein the pressing device further includes a first heating platen capable of heating the first pressing plate.

[4] The laminating apparatus according to any one of the aspects [1] to [3], wherein the pressing device further includes a second heating platen capable of heating the second pressing plate.

The inventors of the present disclosure have made studies to solve the aforementioned problems. As a result, the inventors have found that, for the purpose of making the thickness of a film made of resin or the like uniform, it is useful that a peripheral portion of at least one of the two pressing plates disposed in opposed relation is formed into a tapered surface in such a manner that the distance from the pressing plate opposed thereto increases in an outward direction of the opposed surface thereof.

The laminating apparatus of the present disclosure is capable of effectively preventing at least one of a film and a resin layer sealed by the film from protruding during the pressing to thereby improve the uniformity of the thickness of a laminate. As a result, the laminating apparatus is capable of achieving an improvement in yield of products (laminates).

DESCRIPTION OF EMBODIMENTS

Preferred embodiments according to the present disclosure will now be described in detail. It should be noted that the present disclosure is not limited to the preferred embodiments to be described below.

Figure 1:
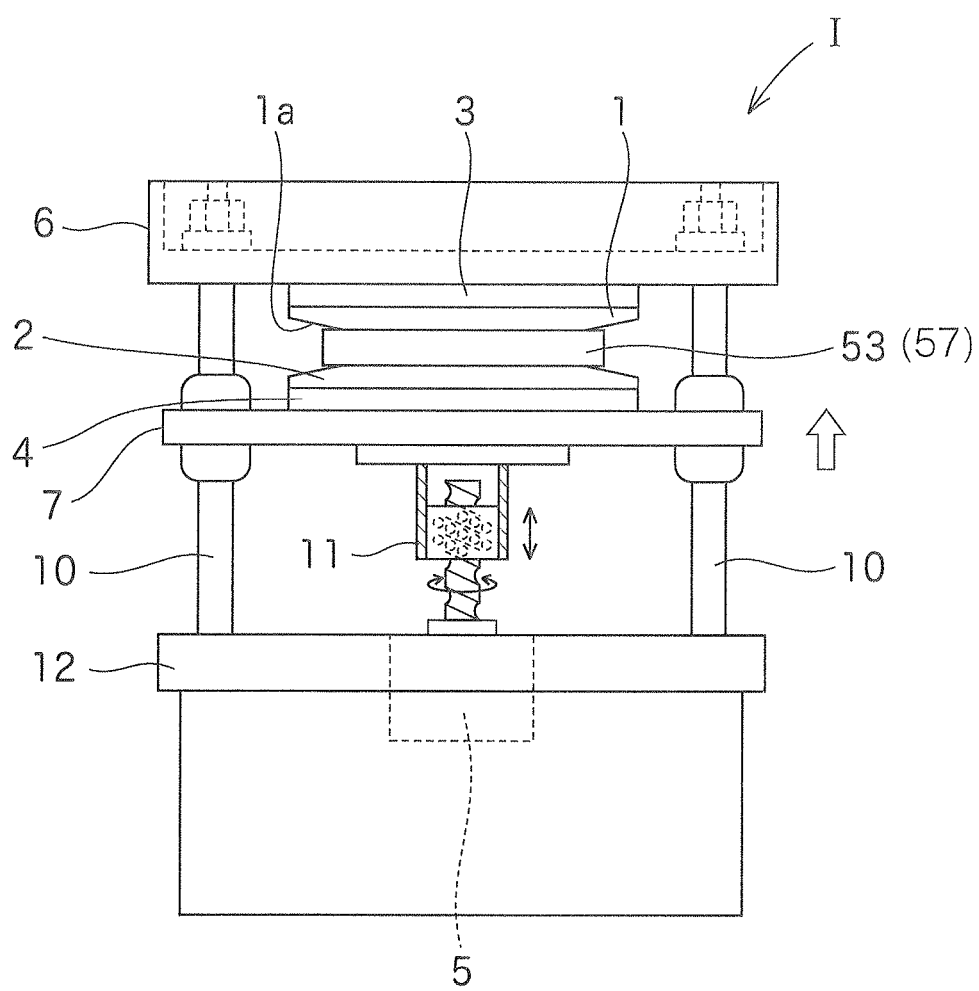
FIG. 1 is a schematic view of a laminating apparatus according to a first preferred embodiment of the present disclosure.

FIG. 1 shows a laminating apparatus I according to a first preferred embodiment of the present disclosure. This laminating apparatus I is an apparatus for laminating a substrate for a build-up board, a resin layer made of a resin composition for sealing various elements, interconnect lines and the like placed on the substrate, and a film for lamination together. The laminating apparatus I includes a first (lower) press block 7 movable back and forth, a second (upper) press block 6 positioned in opposed relation to the first (lower) press block 7, a first (lower) pressing plate 2 mounted to the inside of the first (lower) press block 7, and a second (upper) pressing plate 1 mounted to the inside of the second (upper) press block 6. The pressing plate 1 and the pressing plate 2 are in opposed relation to each other. The substrate, the resin layer, and the film (a workpiece 53) are placed between the pressing plate 1 and the pressing plate 2, and the pressing plate 1 heated by a second (upper) heating platen 3 and the pressing plate 2 heated by a first (lower) heating platen 4 press the workpiece 53 to provide a laminate in which the substrate, the resin layer, and the film are integrated together.

The laminating apparatus I includes: a plurality of support posts 10 (only two are shown in FIG. 1) provided upright on a press stand 12; the upper press block 6 fixed to the support posts 10 with bolts, nuts and the like; the lower press block 7 vertically movably (back-and-forth movably) mounted to the support posts 10; and the like. This lower press block 7 is coupled to a servomotor 5 via a ball screw 11. The servomotor 5 allows the lower press block 7 to move vertically (move back and forth) (as the nuts are moved upwardly and downwardly by the shaft rotation of the ball screw 11). Thus, when pressing the workpiece 53, the lower press block 7 moves upwardly, so that the press blocks 6 and 7 approach each other.

First, the workpiece 53 to be laminated by the laminating apparatus I will be described. As shown in plan view in FIG. 2 and shown in sectional view taken along a line X-X of FIG. 2 in FIG. 3, the workpiece 53 includes a substrate 52, protrusions 54 disposed on the substrate 52, a resin layer 55 made of a resin composition for sealing, and a film 51. The resin layer 55 and the film 51 are layered on top of the substrate 52 and the protrusions 54. Part of the workpiece 53 which is inside the imaginary lines designated by the reference character W (in the direction of the arrow in FIG. 3) is defined as a product area, and part of the workpiece 53 which is outside the imaginary lines W is a frame portion to be finally removed.

An insulative substrate such as a resin or ceramic substrate may be used as the substrate 52 although the substrate 52 is not particularly limited. Specifically, a substrate on which various elements such as relatively large light-emitting elements (LEDs) can be placed as the protrusions 54 or a substrate on which relatively small patterns of copper and the like can be made as the protrusions 54 may be used as the substrate 52.

The protrusions 54 formed on the substrate 52 are not particularly limited. Examples of the protrusions 54 include light-emitting elements (LEDs), semiconductor components, electronic components, and copper patterns. The height of the protrusions 54 is generally 0.01 to 1 mm. The protrusions 54 having a height of 0.01 to 0.2 mm are preferably used.

The resin layer 55 is used to protect the protrusions 54 from light, heat, humidity, and other environments or to impart insulation properties. A resin layer made of a thermosetting resin composition excellent in humidity resistance, thermal shock resistance, stickiness, insulation properties, hot-melt properties, and the like may be used as the resin layer 55 although the resin layer 55 is not particularly limited. For example, a thermosetting resin blended with a stabilizer, a curing agent, coloring matter or dyestuff, a lubricant, and the like may be used for the resin layer 55. Examples of the thermosetting resin include silicone resin, polyimide resin, epoxy resin, and acrylic resin.

The film 51 is used as a support for molding of the resin layer 55. A film capable of protecting the resin layer 55 or preventing the resin layer 55 from adhering to the laminating apparatus I may be used as the film 51 although the film 51 is not particularly limited. Example of such a film include a PET film, a polyethylene film, a polypropylene film, and a polyimide film. Among these, the PET film is preferably used because of its excellent balance of heat resistance, insulation properties, and price.

It should be noted that the resin layer 55 and the film 51 are typically smaller in size than the substrate 52.

Next, the laminating apparatus I will be described (with reference to FIG. 1). The upper press block 6 will be described below as a representative because the upper press block 6 and the lower press block 7 are similar in basic configuration.

The pressing plate 1 provided on the upper press block 6 abuts against the workpiece 53 during pressing. Typically, the pressing plate 1 made of metal is used in consideration of heat resistance. Examples of such metal include stainless steel, iron, aluminum, and alloys of these metals. Stainless steel is preferably used because of its excellent rust resistance. In addition, a metal plate having no flexibility is preferably used from the viewpoint of more exact taper angle adjustment because the pressing plate 1 has a tapered surface in a peripheral portion thereof, which will be described later.

The HV hardness of the pressing plate 1 is generally not less than 150, preferably 200 to 1000, and more preferably 350 to 700. The HV hardness is also known as Vickers hardness, and is measured pursuant to JIS Z 2244.

The thickness of the pressing plate 1 is generally 0.1 to 10 mm, and preferably 1 to 5 mm. It is preferable that the thickness of the pressing plate 1 is in a preferable range because such a thickness not only improves the durability of the pressing plate 1 but also makes it easy to adjust the angle of the taper formed in the peripheral portion. It is also preferable that the surface of the pressing plate 1 is polished to a mirror finish because this allows the resulting laminate to have a more uniform thickness.

Figure 3:
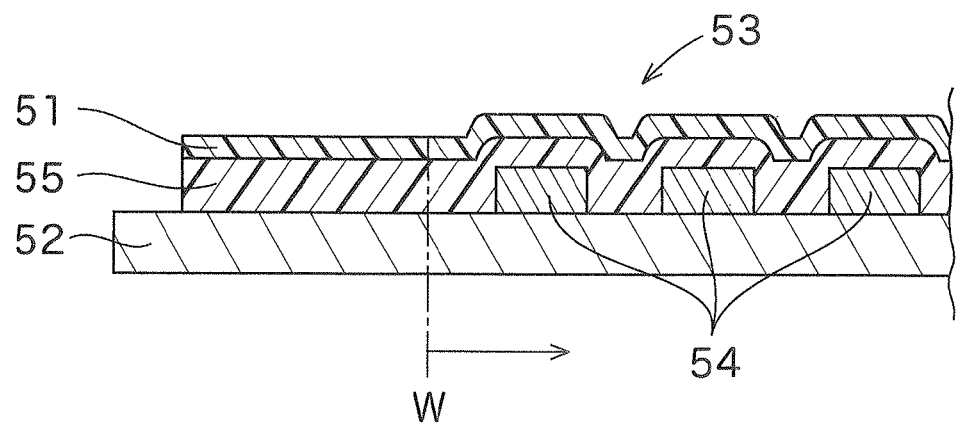
FIG. 3 is a sectional view taken along a line X-X of FIG. 2.
Figure 4:
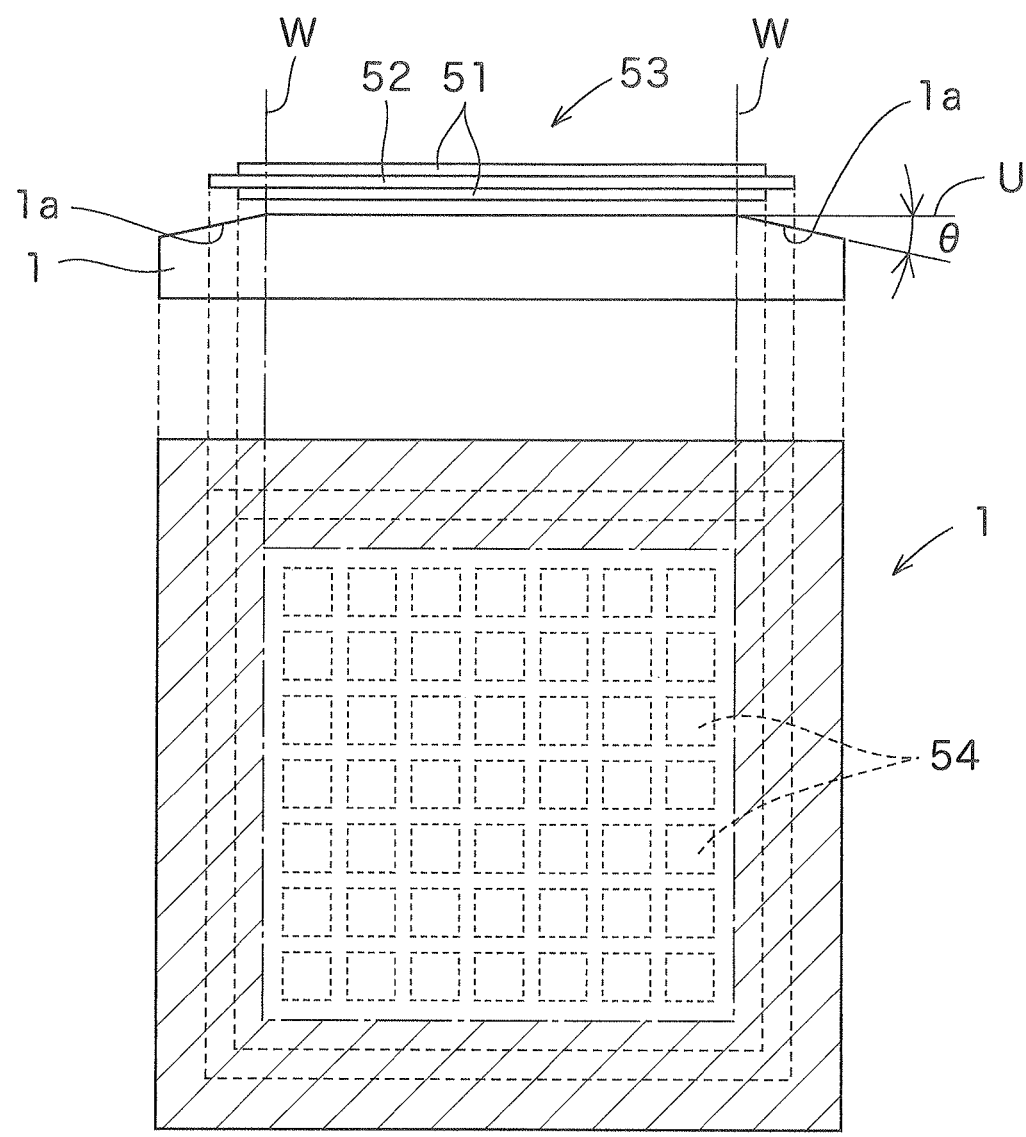
FIG. 4 is a view illustrating a relationship between a pressing plate of the laminating apparatus and the workpiece.

As shown in FIG. 4 (a view illustrating a relationship between the pressing plate and the workpiece), the pressing plate 1 has the peripheral portion (outside the position corresponding to the imaginary line W with reference to FIG. 3) formed into a tapered surface 1a in such a manner as to become more distant from the pressing plate 2 (with reference to FIG. 1) opposed thereto. It should be noted that the resin layer 55 of the workpiece 53 is not shown in FIG. 4.

The taper angle θ of the tapered surface 1a is the angle between a surface of the pressing plate 1 which is parallel to the substrate 52 and the tapered surface 1a, as shown in FIG. 4. The taper angle θ is generally set at 0.01 to 1.5 degrees, but is preferably 0.15 to 1.5 degrees, and particularly preferably 0.2 to 0.8 degrees.

Figure 5:
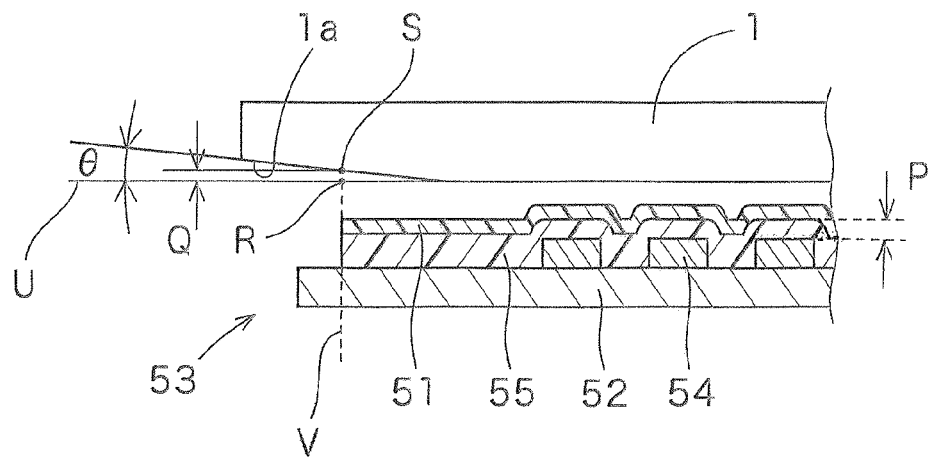
FIG. 5 is a view illustrating a relationship between a tapered surface of the pressing plate and the workpiece.

As shown in FIG. 5, the taper angle θ is determined based on a vertical distance Q between an intersection point S and an intersection point R, and the thickness P of the resin layer 55 on the protrusions 54 of the substrate 52. The intersection point S is a point of intersection between the tapered surface 1a and an imaginary line V perpendicular to the substrate 52 at an edge of the film 51 of the workpiece 53, and the intersection point R is a point of intersection between the imaginary line V and an imaginary line U extending along the surface of the pressing plate 1 which is parallel to the substrate 52 as viewed in a sidewise direction (a direction perpendicular to the plane of the figure). In particular, it is preferable that the vertical distance Q and the thickness P are approximately equal.

The fact that the vertical distance Q and the thickness P are approximately equal means that the difference therebetween is within ±0.02 mm. In particular, it is more preferable that the difference between the vertical distance Q and the thickness P is within ±0.01 mm. The thickness of the resin layer 55 generally tends to be thinner on the protrusions 54 than on other portions.

Figure 6A:
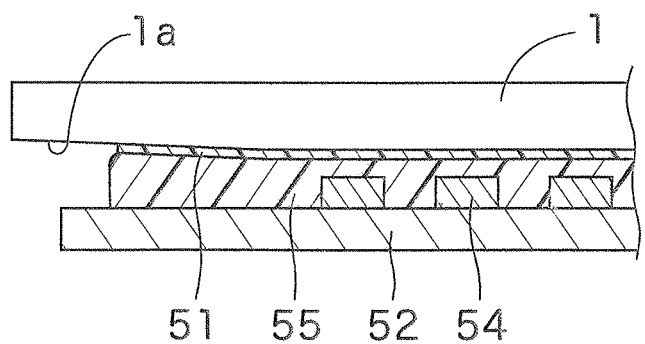
FIGS. 6A and 6B are views illustrating a relationship between a taper angle of the pressing plate and a laminate.

Specifically, when the taper angle θ of the tapered surface 1a is within the aforementioned range, the pressing force on the peripheral portion of the workpiece 53 is relatively weakened during the pressing by the pressing plates 1 and 2, as shown in FIG. 6A. As a result, the resin layer 55 is effectively restrained from being pushed outwardly.

Figure 6B:
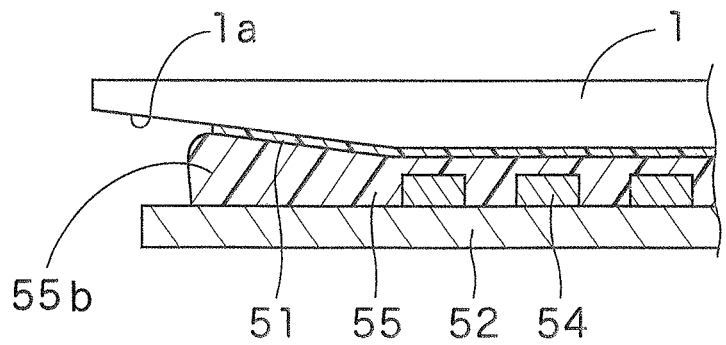

On the other hand, when the taper angle θ exceeds the aforementioned range (the inclination increases), the resin layer 55 is also restrained from being pushed outwardly. However, depending on the types of the resin layer 55 and the film 51, as shown in FIG. 6B, an edge portion of the resin layer 55 may become a resin puddle 55b. This results in a tendency toward a failure to achieve the uniform thickness.

The aforementioned preferred taper angle θ varies depending on the types of the resin layer 55 and the film 51 and the temperature of the pressing plate 1 (the heating temperature by the heating platen 3). That is, a decrease in taper angle θ tends to become preferable when the degree of heating of the pressing plate 1 is increased and the viscosity of the resin layer 55 is decreased. Conversely, an increase in taper angle θ tends to become preferable when the degree of heating of the pressing plate 1 is decreased and the viscosity of the resin layer 55 is increased. The range in which the taper angle θ is increased or decreased is generally ±50% of the aforementioned preferred range.

The pressing plate 1 provided on the upper press block 6 is heated by the heating platen 3, as shown in FIG. 1, and generally presses the workpiece 53 while being heated. The laminating apparatus I further includes a control system (not shown) set up so as to perform heating control on heat sources provided in the heating platen 3. Examples of the heat sources used herein include cartridge heaters and sheet heaters.

As mentioned earlier, the lower press block 7 on the opposite side from (or opposed to) the press block 6 is similar in configuration to the press block 6. An intended laminate 57 is obtained by pressing the workpiece 53 in a heated state between the pressing plates 1 and 2 mounted to the inside of the press blocks 6 and 7.

In the laminating apparatus I, the pressing force on the workpiece 53 is relatively weaker in a location of the pressing plate 1 where the tapered surface 1a is formed than in a location of the pressing plate 1 where the tapered surface 1a is not formed (a horizontal surface). As a result, the resin layer 55 moves slowly in the peripheral portion of the workpiece 53. This portion serves as a stopper to effectively restrain the resin layer 55 from being pushed to an unexpected position. Thus, the laminating apparatus I according to the present disclosure is capable of making the thickness of the resulting laminate uniform up to the peripheral portion thereof to provide a wider range of products (laminates) to be used.

In the pressing step in which the pressing plates 1 and 2 press the workpiece 53, the time for the pressing of the workpiece 53 is generally in the range of 0.1 seconds to 60 minutes, preferably in the range of 0.5 seconds to 10 minutes, and more preferably in the range of one second to one minute, although depending on the type of the workpiece 53 (the substrate and the film) to be pressed. When the pressing time is within the aforementioned time range, the resulting laminate 57 has an excellent balance between thickness uniformity and manufacturing efficiency.

Although it depends on the type of the workpiece 53 (the substrate 52, the resin layer 55, and the film 51) to be pressed, the pressing in the aforementioned pressing step is typically performed by determining the thickness of the laminate 57 to be manufactured and then setting this thickness as the distance between the press blocks 6 and 7 at the end of the pressing. Specifically, the laminating apparatus I controls the operation of rotating the servomotor 5 by the feedback of information on the distance between the press blocks 6 and 7, and slows down or stops the operation of rotating the servomotor 5 when a preset value (the aforementioned distance) is reached.

In the laminating apparatus I, the inclination of the tapered surface 1a of the pressing plate 1 starts at points corresponding to the imaginary lines W of the workpiece 53, as shown in FIG. 4, but is not limited to this.

Figure 2:
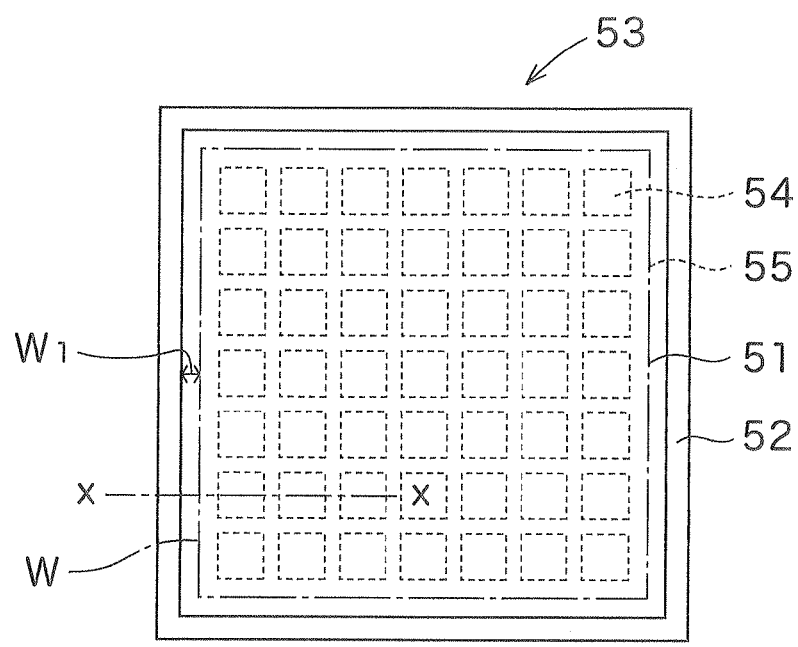
FIG. 2 is a plan view of a workpiece to be laminated by the laminating apparatus.
Figure 7A:
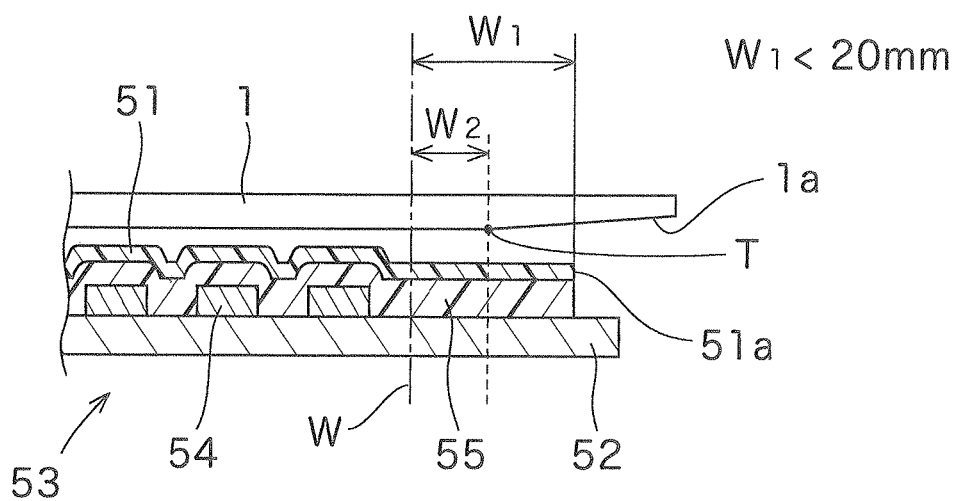
FIGS. 7A and 7B are views illustrating a relationship between the tapered surface of the pressing plate and the workpiece.

It is assumed herein that the film 51, the substrate 52, and the protrusions 54 are arranged to have the centers of gravity coinciding with each other so that the product area inside the imaginary lines W of FIG. 2 is in the center. In this case, when a distance $W_1$ from the imaginary line W to an edge portion 51a of the film 51 as viewed in a sidewise direction is less than 20 mm as shown in FIG. 7A, a distance $W_2$ from the imaginary line W to a taper start location T is preferably in the range of $(\frac{1}{3})W_1$ to $(\frac{2}{3})W_1$, more preferably in the range of $(\frac{3}{8})W_1$ to $(\frac{5}{8})W_1$, and further preferably equal to $(\frac{1}{2})W_1$.

Figure 7B:
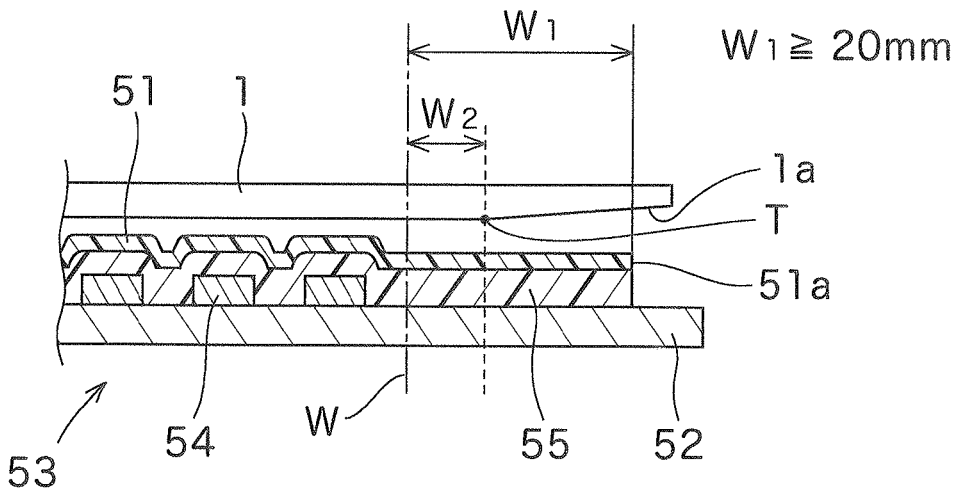

On the other hand, when the distance $W_1$ from the imaginary line W to the edge portion 51a of the film 51 as viewed in the sidewise direction is not less than 20 mm as shown in FIG. 7B, the distance $W_2$ from the imaginary line W to the taper start location T is preferably in the range of 5 to 15 mm, more preferably in the range of 7 to 13 mm, further preferably in the range of 9 to 11 mm, and still further preferably equal to 10 mm.

In the laminating apparatus I, the tapered surface 1a is formed on each of the pressing plates 1 and 2. However, if the resin layer 55 and the film 51 are to be laminated, for example, on only one surface of the substrate 52, the tapered surface 1a may be formed only on the pressing plate lying on the side corresponding to that surface (on the side to be laminated).

In the laminating apparatus I, the heating platen 3 and the heating platen 4 are provided on both of the upper press block 6 and the lower press block 7, respectively. However, if the film or the like is to be laminated on only one surface of the substrate, a heating platen may be provided on only one of the upper and lower press blocks 6 and 7 to heat only one of the upper and lower pressing plates 1 and 2. The heating platens 3 and 4 need not be provided, depending on the type of film and the like. However, it is preferable to provide the heating platens on both of the upper and lower press blocks in terms of heating efficiency and temperature control of the heating platens.

The shapes of the upper and lower pressing plates 1 and 2 are rectangular as seen in plan view in the laminating apparatus I, but are not limited to this. As an example, the shapes of the upper and lower pressing plates 1 and 2 may be designed to be circular, elliptic, polygonal, or other shapes as seen in plan view in accordance with the shape of the workpiece 53.

The pressing plate 1 provided on the upper press block 6 and the pressing plate 2 provided on the lower press block 7 may be identical to or different from each other in material, thickness, and degree of polishing.

Although the heating platen 3 is in direct contact with the pressing plate 1 in the laminating apparatus I, a buffer material may be placed between the pressing plate 1 and the heating platen 3 to disperse the pressure applied during the pressing, for example. It is, however, preferable to provide no buffer material from the viewpoint of improving the accuracy of the taper angle θ of the tapered surface 1a of the pressing plate 1.

The buffer material to be placed is typically made of rubber, plastic, cloth, paper, or the like. Among these, rubber is preferably used for the buffer material from the viewpoint of making the thickness of the laminate 57 obtained by pressing more uniform, and fluororubber is particularly preferably used. The buffer material may contain heat-resistant resin, glass fiber sheets, metal foil sheets, and the like. The containment of these materials is preferable because this increases durability.

The thickness of the buffer material to be placed is generally in the range of 0.1 to 20 mm, preferably in the range of 0.2 to 10 mm, and more preferably in the range of 0.2 to 4 mm. The thickness of the buffer material within the aforementioned range not only provides excellent elastic strength but also prevents the deformation of edge portions, which is preferable. It is also preferable that a surface of the buffer material has a Shore A hardness of not less than 60 degrees. The Shore A hardness is measured pursuant to JIS Z 2246. The buffer material placed on the upper press block 6 and the buffer material placed on the lower press block 7 may be made of the same material or materials different from each other. Thus, these buffer materials may be identical with or differ from each other in thickness and Shore A hardness.

In the laminating apparatus I, the press block 7 is vertically moved (moved back and forth) by the operation of the servomotor 5. However, the vertical movement (back-and-forth movement) of the press block 7 is not limited to that performed by the operation of the servomotor 5. For example, an air cylinder or a hydraulic cylinder may be used in place of the servomotor 5 to move the press block 7. It is, however, preferable to use the servomotor 5 in terms of the ability to control the thickness of the laminate 57 more precisely.

In the laminating apparatus I, the lower press block 7 is vertically moved (moved back and forth). Alternatively, the position of the servomotor or the like may be changed, so that the upper press block 6 is vertically moved (moved back and forth) or so that both of the press blocks 6 and 7 are vertically moved (moved back and forth). It is, however, preferable to vertically move (move back and forth) only one of the press blocks in terms of the ability to control the thickness of the laminate 57 more precisely.

Second Preferred Embodiment

Figure 8:
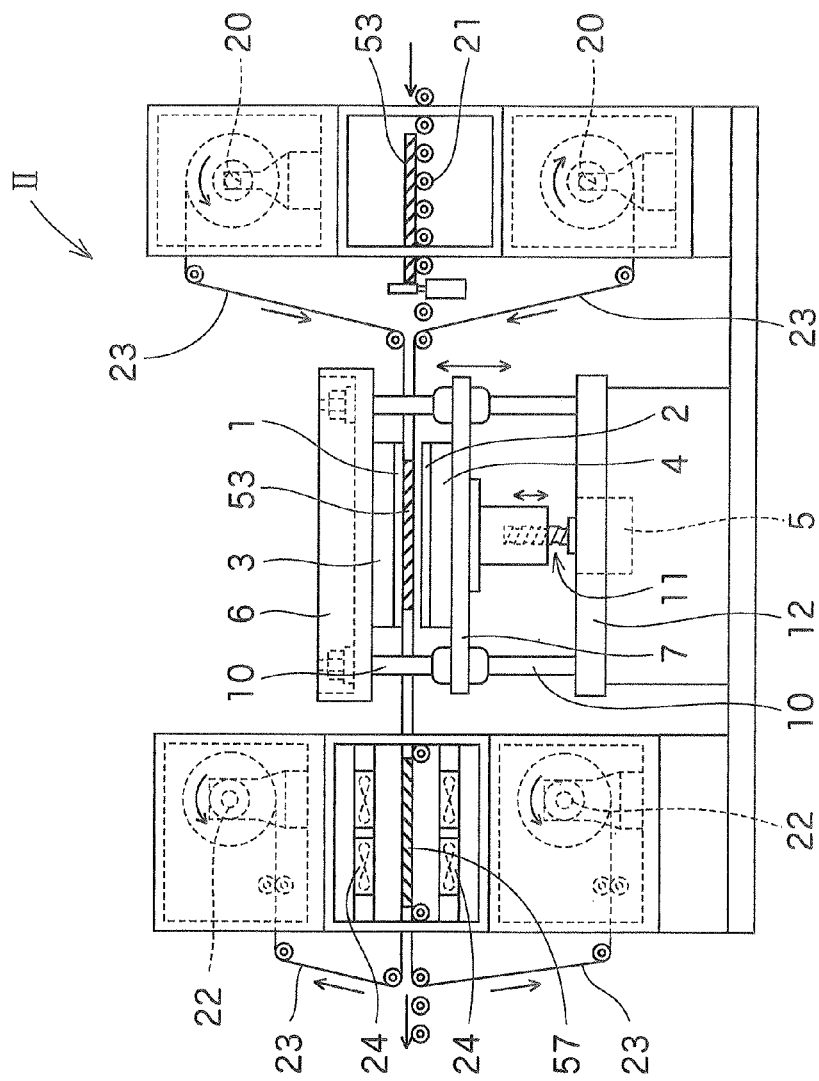
FIG. 8 is a schematic view of a laminating apparatus according to a second preferred embodiment of the present disclosure.

The aforementioned laminating apparatus I is that provided with only the pressing device. However, the laminating apparatus according to the present disclosure may be, for example, a laminating apparatus II provided with a film transport device that uses films to transport the workpiece 53 to the pressing device, as shown in FIG. 8.

The film transport device includes, for example, upper and lower transporting film unwinders 20 located at the starting point of a laminating step, a loading conveyor section 21 for loading the workpiece 53, transporting film winders 22 located at the ending point of the laminating step, transporting films 23 for transporting the workpiece 53 and the laminate 57, and the like.

Each workpiece 53 supplied from the loading conveyor section 21 is sandwiched and held between the upper and lower transporting films 23 unwound from the transporting film unwinders 20. Then, each workpiece 53 is pressed together with the transporting films 23 by the pressing device in synchronization with the travel of the transporting films 23 to become the laminate 57. Then, the laminate 57 is released from holding between the transporting films 23 and taken out. The reference numeral 24 in FIG. 8 designates a cooling fan for cooling the laminate 57.

The laminating apparatus II according to the second preferred embodiment of the present disclosure is capable of successively supplying workpieces 53 at predetermined intervals to the pressing device to thereby efficiently manufacture laminates 57.

Third Preferred Embodiment

Figure 9:
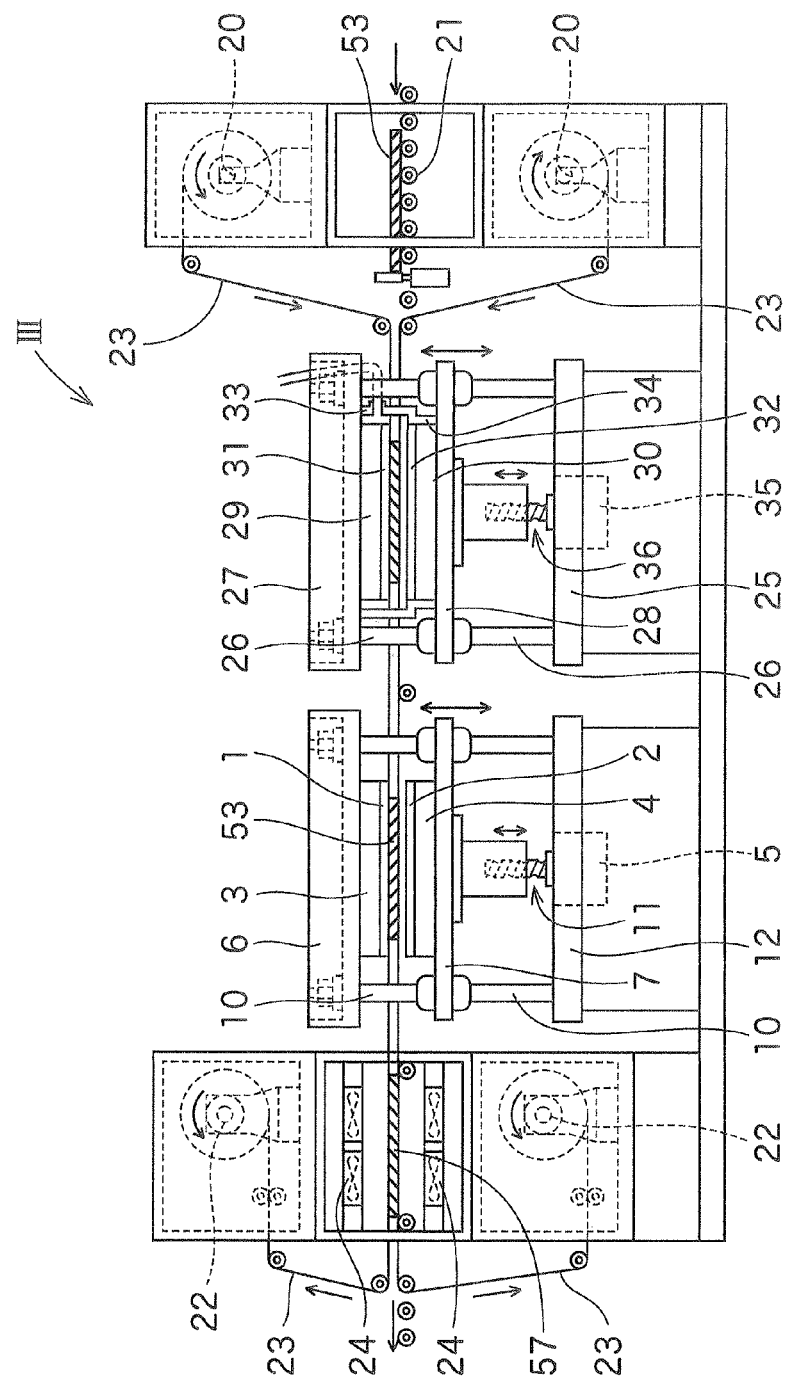
FIG. 9 is a schematic view of a laminating apparatus according to a third preferred embodiment of the present disclosure.

A third preferred embodiment of the present disclosure may be, for example, a laminating apparatus III further provided with a vacuum press device upstream of the pressing device, as shown in FIG. 9.

The vacuum press device includes, for example, a plurality of support posts 26 provided upright on a press stand 25, an upper press block 27 fixed to the support posts 26, and a lower press block 28 vertically movably (back-and-forth movably) mounted to the support posts 26. This lower press block 28 is coupled to a servomotor 35 via a ball screw 36. The operation of the servomotor 35 allows the lower press block 28 to move vertically (move back and forth) (as the nuts are moved upwardly and downwardly by the shaft rotation of the ball screw 36).

Heat sources 29 and 30 including built-in heaters are mounted to the inside (press side) of the upper and lower press blocks 27 and 28, respectively, with heat-insulating materials (not shown) therebetween. Elastic pressing plates 31 and 32 made of heat-resistant rubber or the like are mounted to the inside (press side) of the heat sources 29 and 30, respectively. The upper and lower press blocks 27 and 28 are provided with respective vacuum frames 33 and 34 that are able to be integrated with the upper and lower press blocks 27 and 28. When the press block 28 is moved upwardly to a predetermined position, an enclosed space is formed between the press blocks 27 and 28. The vacuum press device is capable of reducing the pressure in this enclosed space, so that each workpiece 53 within the enclosed space is heated under a reduced pressure and is pressurized.

In the laminating apparatus III, the vacuum press device vacuum-presses each workpiece 53 in this manner before the pressing device presses each workpiece 53, so that the films fit the irregularities of the substrate with higher reliability. Then, the pressing device presses each workpiece 53 with the films fitting the irregularities of the substrate with reliability. This not only effectively prevents the formation of voids but also achieves the manufacture of laminates 57 having a more uniform thickness.

EXAMPLES

Examples using the laminating apparatus of the present disclosure will be described in conjunction with comparative examples. It should be noted that the present disclosure is not limited to the examples.

Example 1

The lamination of the workpiece 53 (the substrate 52, the resin layer 55, and the film 51) to be described below was performed by the laminating apparatus I shown in FIG. 1. The temperature of the upper and lower heating platens 3 and 4 was set at 140° C., and the distance between the upper and lower pressing plates 1 and 2 was set at 0.506 mm. Then, the workpiece 53 was pressed for 40 seconds, whereby the intended laminate 57 was obtained.

In this laminating apparatus I, the size of the upper and lower pressing plates 1 and 2 is as follows: 2 mm in thickness; and 640 mm in width×720 mm in length. The distance $W_1$ from the imaginary line W of FIG. 7A to the edge portion 51a of the film 51 is 6 mm. The taper start location T of the upper and lower pressing plates 1 and 2 is set at a position 3 mm distant from the imaginary line W (that is, the distance $W_2$ is 3 mm).

The taper angle θ of the tapered surface 1a of the pressing plate 1 is 0.344 degrees. The aforementioned taper angle θ was determined by the fact that both of the vertical distance Q and the thickness P of the resin layer 55 on the protrusions 54 were 18 μm on the imaginary line V perpendicular to the substrate 52 at the edge of the film 51 of the workpiece 53 (with reference to FIG. 5). The tapered surface of the pressing plate 2 is also formed at the same taper angle θ as the tapered surface 1a.

Substrate 52

A printed board obtained by forming copper pattern having a height of 18 μm on a copper clad laminate having a width of 510 mm, a length of 515 mm, and a thickness of 400 μm to provide the protrusions 54.

Resin Layer 55

A sealing resin made of an epoxy resin composition and having a width of 484 mm, a length of 489 mm, and a thickness of 27.5 μm.

Film 51

A film made of PET and having a width of 484 mm, a length of 489 mm, and a thickness of 38 μm.

Example 2

The taper angle θ of the tapered surface 1a of Example 1 mentioned above was set at 0.191 degrees. This taper angle θ was determined by the fact that both of the vertical distance Q and the thickness P of the resin layer 55 on the protrusions 54 were 10 μm on the imaginary line V.

In other words, the workpiece 53 similar to that of Example 1 except that the protrusions 54 were provided on the substrate 52 by forming a copper pattern having a height of 10 μm and that the resin layer 55 was changed to that having a thickness of 22.5 μm was used, and pressing was performed under the same conditions as in Example 1 to obtain the intended laminate 57.

Comparative Example 1

Figure 15A:
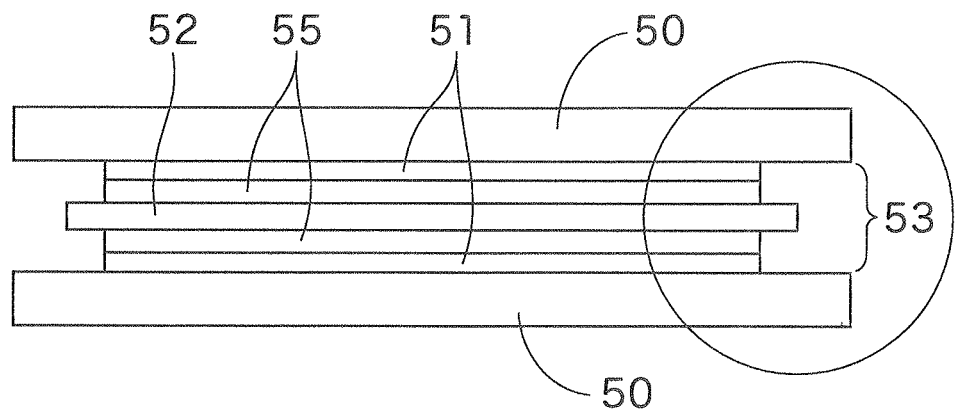
FIG. 15A is a view illustrating a state of a laminate in a conventional apparatus.
Figure 15B:
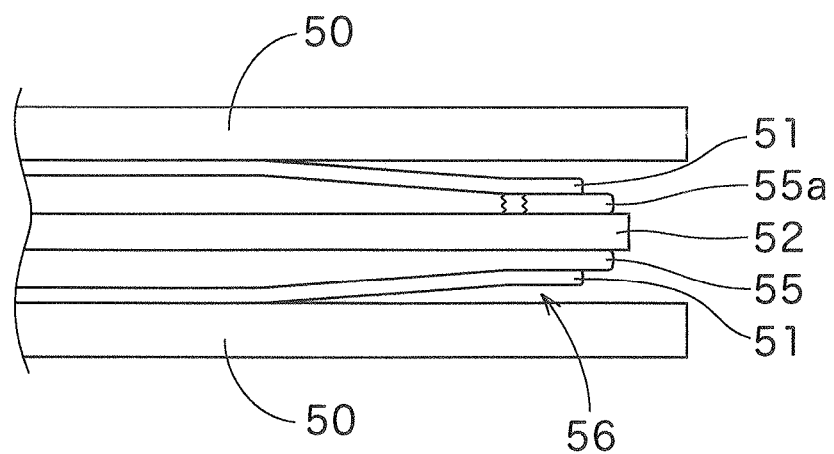
FIG. 15B is a partial enlarged view of FIG. 15A.

The apparatus and workpiece 53 similar to those of Example 1 except that the pressing plates 1 and 2 were used which had no tapered surfaces, and pressing was performed under the same conditions to obtain the intended laminate 56. That is, this apparatus is the conventional apparatus shown in FIGS. 15A and 15B.

Comparative Example 2

The apparatus and workpiece 53 similar to those of Example 2 except that the pressing plates 1 and 2 were used which had no tapered surfaces, and pressing was performed under the same conditions to obtain the intended laminate 56. That is, this apparatus is the conventional apparatus shown in FIGS. 15A and 15B.

Figure 10A:
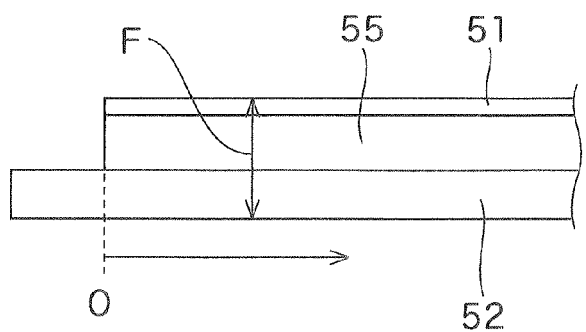
FIG. 10A is a view illustrating a method of measuring the thickness of a laminate manufactured by the Examples of the present disclosure.
Figure 10B:
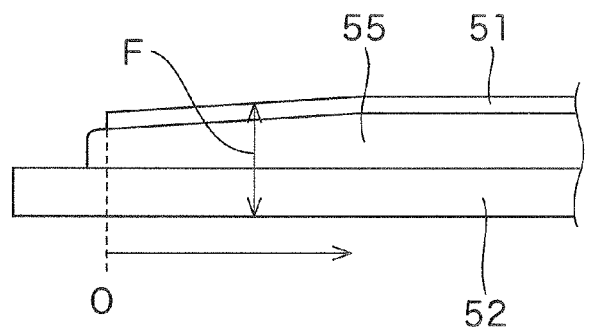
FIG. 10B is a view illustrating a method of measuring the thickness of a laminate manufactured by the Comparative Examples.
Figure 11:
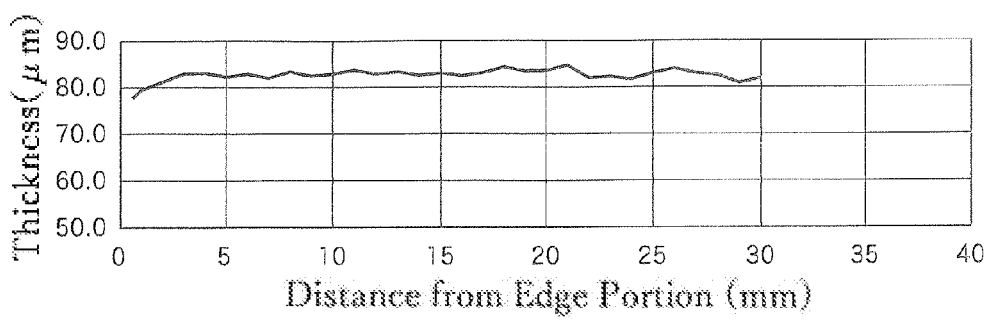
FIG. 11 is a graph showing a relationship between a distance from an edge portion and a film thickness in Example 1.
Figure 12:
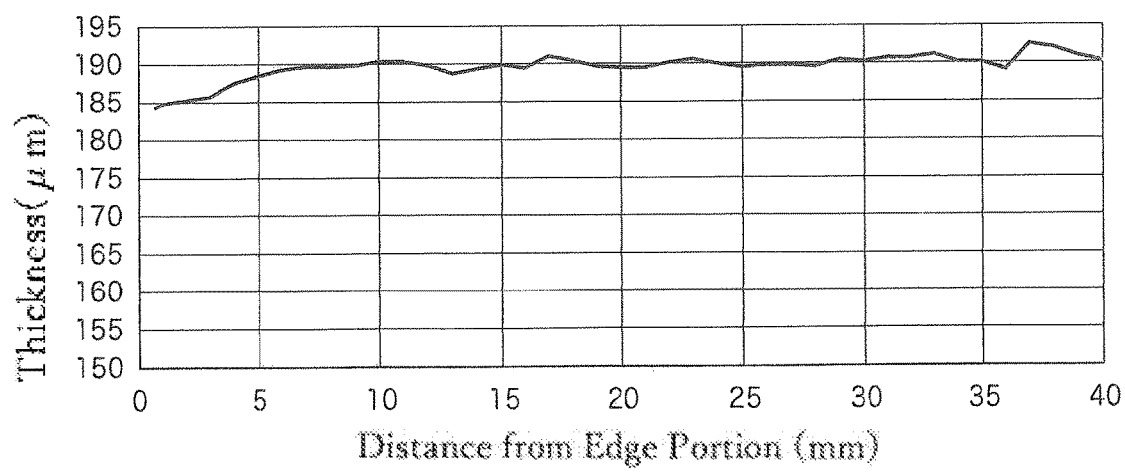
FIG. 12 is a graph showing a relationship between the distance from the edge portion and the film thickness in Example 2.
Figure 13:
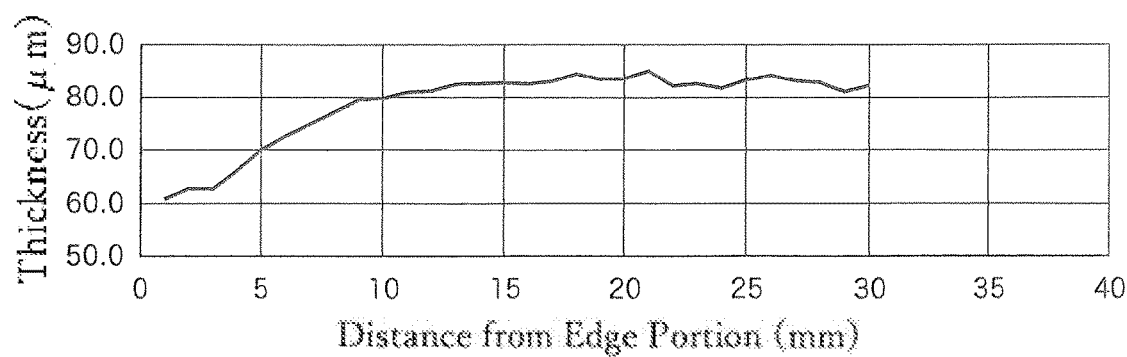
FIG. 13 is a graph showing a relationship between the distance from the edge portion and the film thickness in Comparative Example 1.
Figure 14:
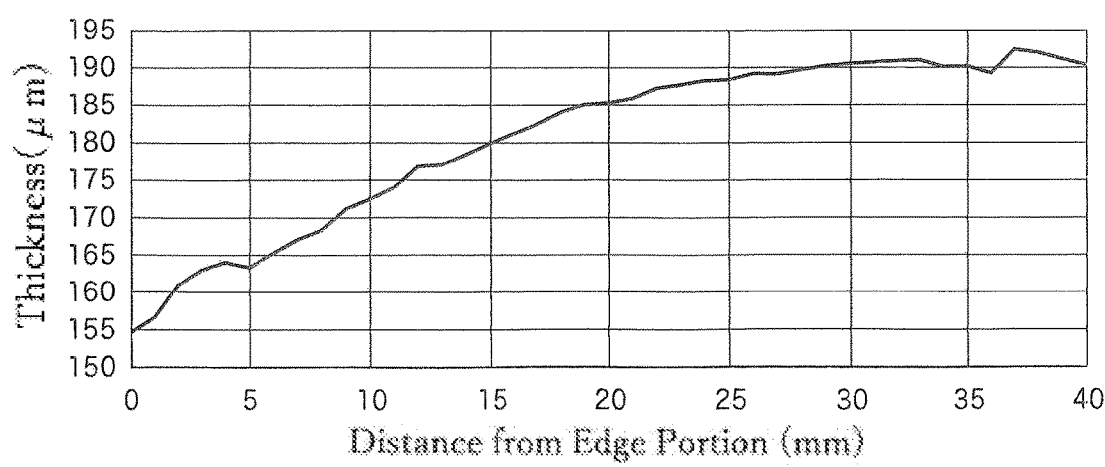
FIG. 14 is a graph showing a relationship between the distance from the edge portion and the film thickness in Comparative Example 2.

As shown in FIG. 10A for Examples 1 and 2 and in FIG. 10B for Comparative Examples 1 and 2, the thickness F of the laminates obtained in Examples 1 and 2 and Comparative Examples 1 and 2 mentioned above was measured using an eddy-current coating thickness gauge in an inward direction (in a direction indicated by the arrows in FIGS. 10A and 10B) with an edge portion of the film 51 defined as zero. The results of the measurements are shown in FIG. 11 (Example 1), FIG. 12 (Example 2), FIG. 13 (Comparative Example 1), and FIG. 14 (Comparative Example 2).

It should be noted that 10A schematically shows Examples 1 and 2 and FIG. 10B schematically shows Comparative Examples 1 and 2.

As a result, the laminates 57 of Examples 1 and 2 showed almost no change in the thickness direction, while the laminates 56 of Comparative Examples 1 and 2 showed that the thickness decreased toward the edge portion of the film 51 (where the distance from the edge portion was zero in the figures) and that this tendency became particularly pronounced as the thickness of the resin layer 55 became greater. Therefore, the laminating apparatus according to the present disclosure is capable of making the thickness of the resulting laminate uniform up to the edge portion of the laminate to increase the yield of products.

Although specific forms in the present disclosure have been described in the aforementioned examples, the aforementioned examples should be considered as merely illustrative and not restrictive. It is contemplated that various modifications evident to those skilled in the art could be made without departing from the scope of the present disclosure.

The laminating apparatus of the present disclosure is capable of improving the uniformity of the thickness of the resulting laminate and as a result improving the yield of products (laminates). The laminating apparatus of the present disclosure is therefore suitable for the manufacture of the products (laminates) that require control of finished product thickness, such as build-up boards and boards on which light emitting elements such as LEDs are mounted.

The invention claimed is:

1. A laminating apparatus, comprising:
   a pressing device for pressing a substrate and a film, the pressing device including
      a first press block movable back and forth,
      a second press block disposed in opposed relation to the first press block,
      a first pressing plate mounted to the inside of the first press block, and
      a second pressing plate mounted to the inside of the second press block,
   wherein the first pressing plate and the second pressing plate are opposed to each other,
   wherein a surface of the first pressing plate which is opposed to the second pressing plate has a peripheral portion formed into a tapered surface in such a manner that a distance from the first pressing plate to the second pressing plate increases in an outward direction;
   wherein a portion other than the peripheral portion of the surface of the first pressing plate is formed into a horizontal surface;
   wherein a surface of the second pressing plate which is opposed to the first pressing plate has a peripheral portion formed into a tapered surface in such a manner that a distance from the second pressing plate to the first pressing plate increases in an outward direction;
   wherein a portion other than the peripheral portion of the surface of the second pressing plate is formed into a horizontal surface; and
   wherein a taper angle θ between the tapered surface of the first pressing plate and a portion of the surface of the first pressing plate which is parallel to the substrate is set at 0.01 to 1.5 degrees.

2. The laminating apparatus according to claim 1, wherein the pressing device further includes a first heating platen capable of heating the first pressing plate.

3. The laminating apparatus according to claim 1, wherein the pressing device further includes a second heating platen capable of heating the second pressing plate.

4. The laminating apparatus according to claim 1, wherein Vickers hardness of the first pressing plate is 200 to 1000.

5. The laminating apparatus according to claim 1, wherein Vickers hardness of the first pressing plate is 350 to 700.

6. The laminating apparatus according to claim 1, wherein the taper angle θ between the tapered surface of the first pressing plate and the portion of the surface of the first pressing plate which is parallel to the substrate is set at 0.15 to 1.5 degrees.

7. The laminating apparatus according to claim 1, wherein the taper angle θ between the tapered surface of the first pressing plate and the portion of the surface of the first pressing plate which is parallel to the substrate is set at 0.2 to 0.8 degrees.

8. The laminating apparatus according to claim 1,
   wherein a workpiece to be laminated comprises the substrate, a resin layer, and the film, and
   wherein the taper angle θ is set so that a vertical distance Q and a thickness P of the resin layer on protrusions of the substrate are approximately equal,
   the vertical distance Q being a distance between (i) an intersection point S of intersection between the tapered surface and an imaginary line V perpendicular to the substrate at an edge of the film of the workpiece, and (ii) an intersection point R of intersection between the imaginary line V and an imaginary line U extending along the surface of the first pressing plate which is parallel to the substrate as viewed in a sidewise direction.

9. The laminating apparatus according to claim 6,
   wherein a workpiece to be laminated comprises the substrate, a resin layer, and the film, and
   wherein the taper angle θ is set so that a vertical distance Q and a thickness P of the resin layer on protrusions of the substrate are approximately equal,
   the vertical distance Q being a distance between (i) an intersection point S of intersection between the tapered surface and an imaginary line V perpendicular to the substrate at an edge of the film of the workpiece, and (ii) an intersection point R of intersection between the imaginary line V and an imaginary line U extending along the surface of the first pressing plate which is parallel to the substrate as viewed in a sidewise direction.

10. The laminating apparatus according to claim 7,
    wherein a workpiece to be laminated comprises the substrate, a resin layer, and the film, and
    wherein the taper angle θ is set so that a vertical distance Q and a thickness P of the resin layer on protrusions of the substrate are approximately equal,
    the vertical distance Q being a distance between (i) an intersection point S of intersection between the tapered surface and an imaginary line V perpendicular to the substrate at an edge of the film of the workpiece, and (ii) an intersection point R of intersection between the imaginary line V and an imaginary line U extending along the surface of the first pressing plate which is parallel to the substrate as viewed in a sidewise direction.

11. A laminating apparatus, comprising:
    a vacuum press device for pressing a substrate and a film under a reduced pressure; and
    a pressing device for further pressing the substrate and the film pressed by the vacuum press device, the pressing device including
       a first press block movable back and forth,
       a second press block disposed in opposed relation to the first press block,
       a first pressing plate mounted to the inside of the first press block, and
       a second pressing plate mounted to the inside of the second press block,
    wherein the first pressing plate and the second pressing plate are opposed to each other,
    wherein a surface of the first pressing plate which is opposed to the second pressing plate has a peripheral portion formed into a tapered surface in such a manner that a distance from the first pressing plate to the second pressing plate increases in an outward direction;

wherein a portion other than the peripheral portion of the surface of the first pressing plate is formed into a horizontal surface; and wherein a taper angle $\theta$ between the tapered surface of the first pressing plate and a portion of the surface of the first pressing plate which is parallel to the substrate is set at 0.01 to 1.5 degrees.

\* \* \* \* \*